Inventor
E. P. G. WRIGHT
M. DEN HERTOG
By [signature]
Attorney

Inventor
E.P.G. WRIGHT
M. DEN HERTOG
By
Attorney

Inventor
E. P. G. WRIGHT
M. DEN HERTOG
By [signature]
Attorney

Inventor
E.P.G. WRIGHT
M. DEN HERTOG
By
Attorney

Inventor
E.P.G. WRIGHT
M. DEN HERTOG
By
Attorney

United States Patent Office 3,377,431
Patented Apr. 9, 1968

3,377,431
TELEPHONE SYSTEMS WITH SEPARATE SIGNALLING CIRCUITS

Esmond Philip Goodwin Wright, London, England, and Martinus Den Hertog, Antwerp, Belgium, assignors to International Standard Electric Corporation, New York, N.Y., a corporation of Delaware Filed Mar. 6, 1964, Ser. No. 349,987
Claims priority, application Great Britain, Mar. 8, 1963, 9,305/63
8 Claims. (Cl. 179—18)

ABSTRACT OF THE DISCLOSURE

A telecommunication system is provided having a number of message channels interconnecting two or more switching centres by one or more different routes. One or more separate and independent signalling circuits provide a means for exchanging signals relating to the establishment and supervision of message connections between the centres. The signalling circuits determine an available route before message connections are completed.

Figure 1:
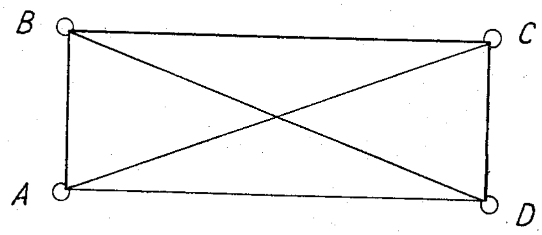

This invention relates to telecommunication systems in which a number of switching centres or exchanges are interconnected by message channels over a plurality of routes.

With the advent of electronics and the development of data handling and processing techniques, telecommunication networks are tending to become more and more automatic in operation, thus eliminating the need for human operators in the switching centres. In the telephone system known as "subscriber trunk dialing" a subscriber on a national network can, by using special dialling codes, establish a call to subscribers on other exchanges throughout the country without the intervention of an exchange operator. This automation of the telephone is being further developed to enable international and intercontinental calls to be handled in a similar manner.

According to the invention there is provided a telecommunication system including a number of message channels connecting two or more switching centres by one or more different routes, and one or more separate independent signalling circuits providing a means of exchanging signals relating to the establishment and supervision of message connections from each centre to every other centre.

The switching centres referred to above may be national, international or intercontinental centres.

According to the invention there is also provided a telecommunication system including a number of message channels connecting two or more switching centres by one or more different routes, the centres being connected also by separate independent signalling circuits, each centre including signal processing and route control equipment whereby signals relating to the establishment and supervision of a message connection are received, processed and re-transmitted according to the significance of the signals over appropriate signalling circuits, the signal processing and route control equipment in the switching centres involved being arranged to select and complete a signal circuit route between said centres prior to the seizure and occupation of a message channel route for the connection.

The separation of the signal circuits from the message channels allows the latter to be designed with characteristics specifically suitable for message transmission alone. The removal of all signals to one special signalling channel allows more time on the other channels for message transmission. Similarly, the completion of the signalling for a call prior to the occupation of the message channels means that the channel time is not wasted whilst signalling is carried out, especially when the signalling indicates that the call cannot be completed. In the case of telephone systems, since the possibility of speech imitation is removed, the signalling conditions can be reduced in duration to the minimum times required to operate satisfactorily the signal receiving equipments at each exchange.

The invention is particularly suitable for systems in which the message channels are designed for some form of multiplex operation, such as Time Assignment Speech Interpolation (TASI) telephone systems. The development of communication satellites each of which can serve a number of international or intercontinental centres is another example of a system to which the invention is particularly suited, as will be explained below.

Figure 2:
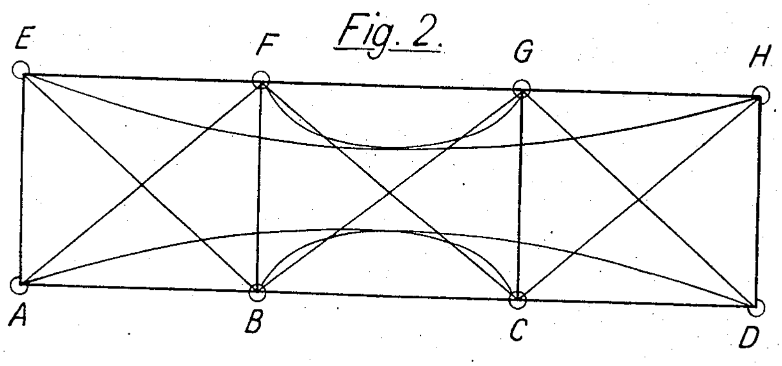
Figure 7:
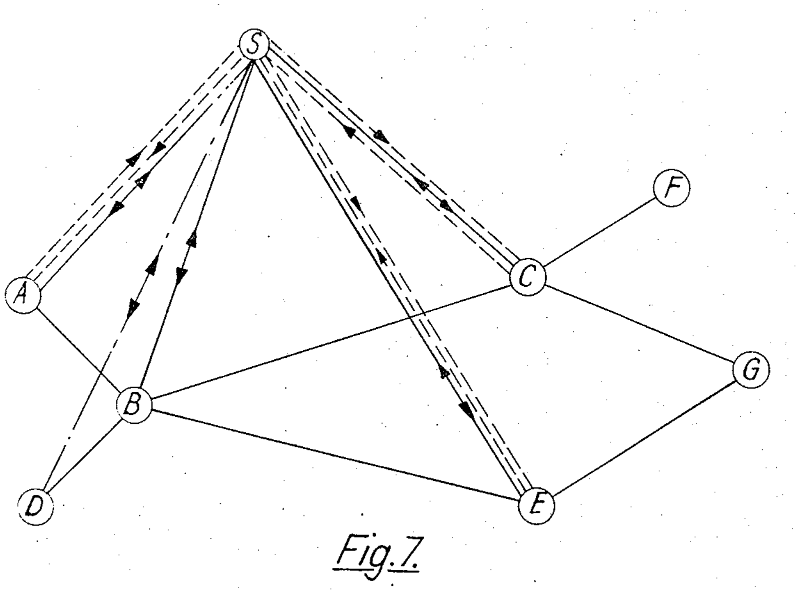
Figure 3:
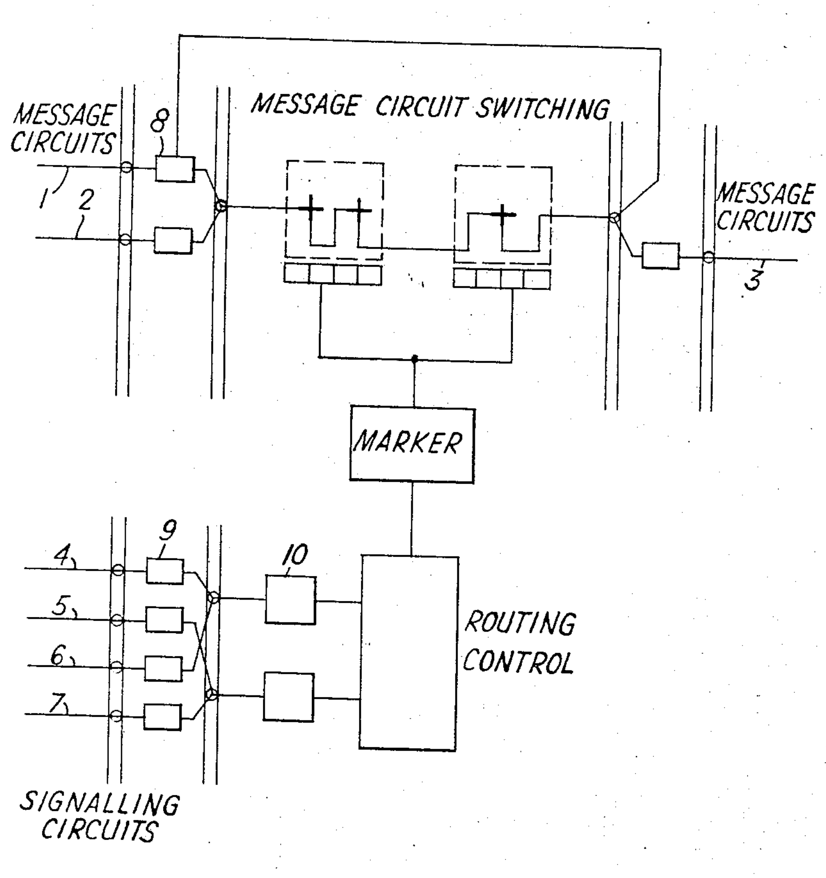
Figure 4:
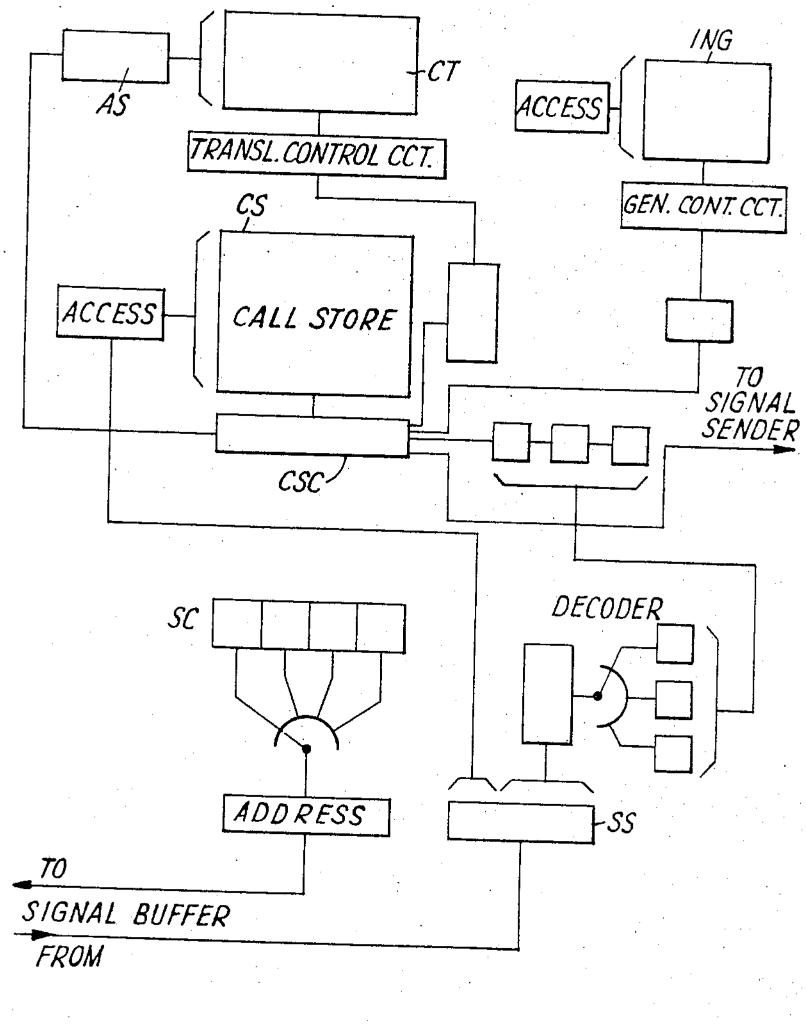
Figure 5:
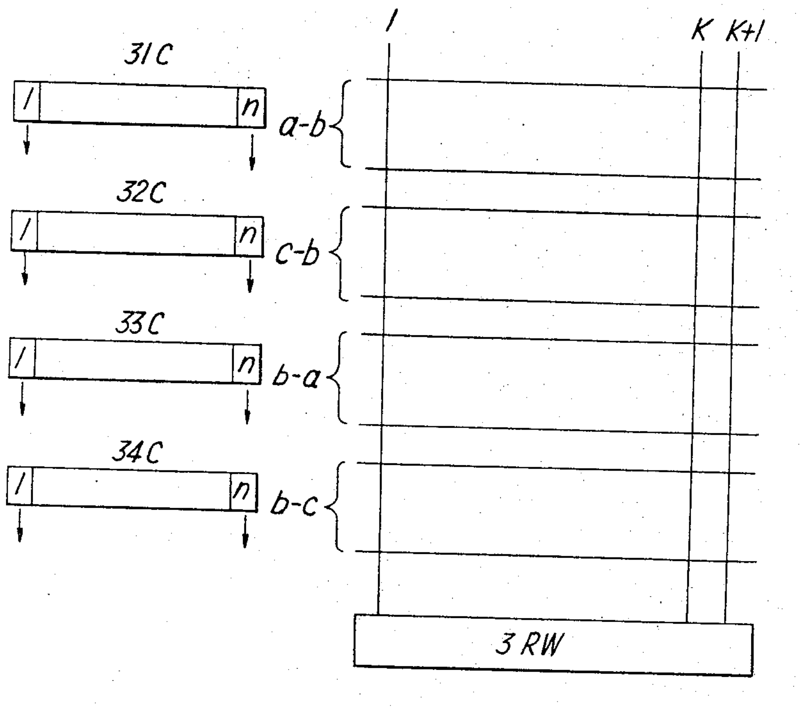
Figure 6:
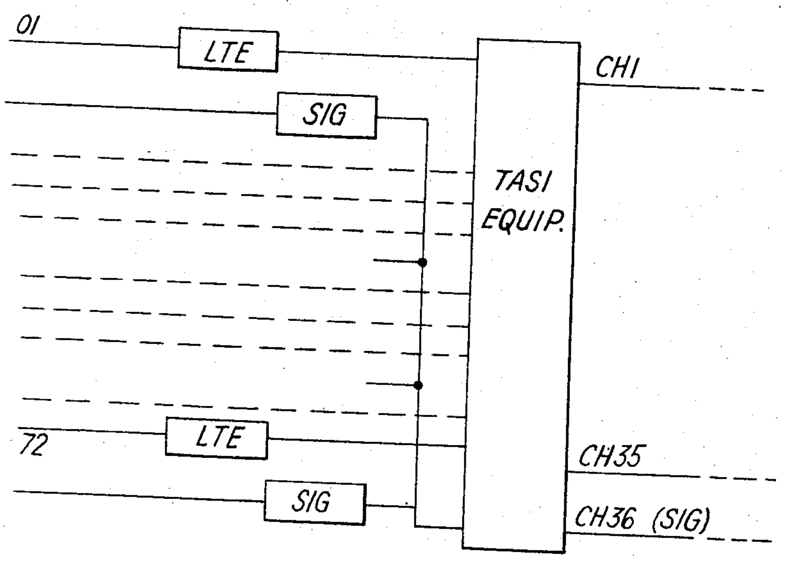

Embodiments of the invention will now be described with reference to the accompanying drawings in which:

FIGS. 1 and 2 are route diagrams showing the message and signalling interconnections between a number of switching centres, FIG. 3 is a block diagram of a telephone switching centre, FIG. 4 is a block diagram of the signal route control equipment, FIG. 5 is a block diagram of a message buffer for a signalling circuit, FIG. 6 illustrates in block form a TASI system in which one communication channel is used as a separate signalling channel, and FIG. 7 illustrates a satellite system using separate signalling and message routes.

It is to be noted that the arrangements to be described use known electronic techniques and individual equipments throughout. Thus information storage may be accomplished by a ferrite core matrix served by appropriate READ and WRITE circuits. An example of a ferrite core matrix is described in RCA Review, vol. 13, June 1952, pp. 183–201. Such a matrix provides a plurality of individual stores access to which may be on a cyclic basis, or at random. The handling of telephone signals in data form by such equipments enables the signals to be processed as required at high speeds compared with the original signal durations. For example, a single signalling circuit may be presenting a signal every 40 milliseconds whereas the electronic equipment is capable of carrying out one hundred functions per millisecond.

To illustrate the route selection and route indication facilities provided by the invention FIG. 1 shows an example of four centres A, B, C and D with all possible combinations of high usage and final routes. It is contemplated that for all the calls leaving A for B, C or D the called subscriber's number is sent from A to B. All calls to C have the numbers sent from A to C via B, and calls from A to D have their numbers sent from A to D via B and C.

There is no necessity for the message circuits to be established immediately. This process is only initiated when signalling for the call is completed. The establishment of the message circuits can be initiated, for example, by a signal from the called end when the line selector is seized.

Once the signalling has been completed in the case of a call from A to D the marker at D (assuming that the establishment of the message circuits is initiated by a signal from the called end) hunts for a high usage A–D message channel, failing which it seeks a B–D message channel. In either case the identity of the channel chosen is passed via C to B. If an A–D channel is selected the identity of that channel is passed to A so that A can carry out the required switching operation. If the B–D route is taken then it is necessary for the marker at B to select a channel from B to A, undertake the switching at B and pass to A the instruction for the switching at A.

If all the A–D and B–D channels are in use an effort is made at D to find a message channel available to C and this information is passed to C for action along the lines indicated above for the centre B.

After the message channel has been set up there will be a succession of supervisory signals to pass between the terminal centres until release takes place. All the signals for a call between A and D pass through B and C and procedures must be adopted whereby the terminal centres A and D are aware of the message channel number to which the supervisory signals referred.

In the initial operations the call number information has to be transferred to the called terminal and since the message channel has not yet been selected it is impossible to use the message channel number for call identification purposes. Therefore a call from A to D is initially assigned an identify number outside the range of numbers identifying the message channels. Each of the groups A to B, A to C, A to D, B to C, B to D and C to D uses a separate series of numbers. Such identity numbers are not indicative of the message channels employed but only of the calls.

The identity of a call is changed, when the message channel is assigned, by passing a signal to the effect that a new identification is being imposed. The use of the message channel identity serves a further purpose in that reference to the call identifications in the Routing Control circuit forms a means of ascertaining whether a message channel has been assigned.

It will be assumed that a call from A to D is initially assigned a hypothetical number such as 101 and that subsequently D selects a high usage circuit number 011 between D and A. This identification must be passed from D to C as a replacement for 101 and C must repeat the process to B. Thereafter B repeats the process to A. All the subsequent supervisory signals through A, B, C and D will carry the identification 011. It will be seen that each of the centres A, B, C and D will be aware of the availability of all the high usage message channels in the network shown in FIG. 1.

FIG. 2 illustrates a more complex network such as might exist in practice. A call from E to H might use the signal routes from E through F and G to H and the message channels EB, BC, CD and DH. The state of occupancy of the B to D message channel is then recorded in E, F, G and H but not at A, B, C and D. Many possibilities exist such as assigning certain centres, for example, F and C as information centres which could be achieved by interchanging message channel assignment information between these centres. Such information can be handled as data passing over the signalling channels FG and GC or FB and BC.

A separate-channel signalling system as outlined above is convenient for permitting route choice to be as flexible as possible, because the main transit switching centres would be aware of the traffic loading of the adjacent routes and, furthermore, they would have facilities to obtain rapid information about the state of the more distant routes. Similarly information would be equally rapidly available in respect of the signalling routes over which the call had been previously extended. It must be borne in mind that the switching centres are capable of performing the various functions associated with signalling at a much higher speed than the subscriber signalling, as has been earlier stated.

In the telephone switching centre illustrated in FIG. 3 it is assumed that connections can be made between a number of bothway speech circuits such as 1 and a number of incoming oneway speech circuits such as 2 and a number of outgoing oneway speech circuits such as 3. There is also a number of incoming and outgoing oneway signalling circuits such as 4, 5, 6, 7. The speech circuits and the signalling circuits are terminated in suitable line circuits such as 8, 9, within the switching centre. Signal circuits 4 and 5 are associated with message circuit 1, signal circuit 6 with message circuit 2, and signal circuit 7 with message circuit 3.

The incoming and outgoing signalling circuits are connected respectively to incoming and outgoing buffer stores 10, which store incoming and outgoing signals as required. Incoming signals are stored until they can be processed by the routing control and outgoing signals from the routing control are stored until they can be retransmitted over an outgoing signal route.

The routing control receives signals over the separate signalling circuits in respect of route selection information and call supervision. The route control circuit has to decide which signals must be retransmitted over selected outgoing signalling circuits and from time to time it must organize switching connections and subsequently release these connections. The routing control circuit has no means of exchanging intelligence over the message circuits.

The routing control circuit shown in FIG. 4 is treated as a data processing equipment and is designed to operate under programme control or by "wired logic" controlled by a series of counters and shift registers.

The programme must be arranged to make periodic collections of the signals waiting in the coming signal buffer. The storage capacity of this buffer enables a certain number of signals to assemble, but the interval between the connections is sufficiently small to ensure that signals are not mislaid. The buffer is of conventional ferrite core type, and as shown in FIG. 5 comprises four sections *ab, cb, ba* and *bc* each having *n* positions and served by common READ and WRITE circuits such as 3RW.

Certain of the signal store positions in the buffer may contain no significant information and the transfer circuits are arranged to disregard such positions. The elements of a signal are stored as a word in element stores such as 1 to K and each word position has a processing element $K+1$. The word positions marked *ab* are used for signals arriving over signalling channel 4; the positions marked *cb* are used for signals arriving over channel 6; the positions *ba* and *bc* are used for signals outgoing on signalling channels 5 and 7 respectively.

The signals arriving on the channel 4 are stored initially on a shift register (not shown) and transferred in the parallel mode, when the word is complete, into the first word store of section *ab*. Immediately after this transfer the distributor 31C is caused to make one step so that the next received messarge can be directed to the second word store in section *ab*. The distributor 31C thus scans the word positions in cyclic order and distributes the signals into sequential positions of the store. Certain of the positions would contain no information and in such cases the $K+1$ store position would be left in its normal condition. When the store positions contain information, the $K+1$ store element is changed to its set condition.

The information in the buffer store is transferred periodically to the routing control circuit. The distributor providing access to the signals is stepped through a series of positions representing different addresses in the store. This distributor searches through section *ab* of the buffer store in the same order as the distributor 31C. It detects from the $K+1$ element whether there is any signal in each word position it reaches, and when it reaches the position indicated by the distributor 31C it would be aware that all waiting signals had been extracted. When the address of the routing control signal collector corresponds to that of the distributor 31C the collection cycle is halted.

The incoming signals from channel 6 are handled similarly, it being understood that the routing control might withdraw all signals from one section and subsequently all the signals from the next section. To know at what point it should start scanning a section, the position of the distributors 31C and 32C which cause the scanning to cease are recorded in the message collector to provide a reference basis.

It will be appreciated that the number of word positions in sections *ab* and *cb* are unrelated to the number of associated message channels. It is necessary that the route control circuit should transfer signals from the buffer store before the distributors 31C and 32C are ready to insert new signals. When a signal is transferred out of a word position, the appropriate $K+1$ element is restored to normal.

The loading of the outgoing buffers for the transmission of signals over channels 5 and 7 are completed in a similar manner. The distributors 33C and 34C are examined in cyclic order to extract the contents of their buffers for transmission. It is immaterial whether the stores contain information or not. The routing control is directed by the distributors to the next word store in the reading sequence. If this store is in use, as indicated by the $K+1$ element, the routing control advances to the first free store position. On transferring the signal to the buffer, the routing control operates the $K+1$ element and this is restored when the signal is retransmitted from the buffer.

The number of word positions in storage sections *ba* and *bc* are a function of the number signals to be transmitted but if there should be a peak of signals it makes no difference whether they are held in the routing control or the buffer.

Having described the nature and operation of the signal buffers the routing control will now be described with reference to FIG. 4.

The signal SC is a store with a section relating to each signalling circuit having access to the route control circuit. The contents of each section of the store SC is a number which represents an address in the incoming signal buffer. The collector reads the store content of the first section and transfers this information in parallel form to an access control of the incoming signal buffer. This transfer can only occur when the access control is not engaged in inserting a signal in the buffer, so that the transfer necessitates checking for an indication that the access control is free before the transfer takes place.

Having received an address as a number of binary signals the contents of the corresponding part of the buffer store are read. The buffer store reading circuit checks from the $K+1$ element whether that part of the store contains a signal or not. If the indication sent back to the collector SC indicates that there is no signal, the number in that section of the collector store is advanced by one and the new address is sent to the buffer access selector to extract any signal from the next position. In addition to the indication that there is no signal in the portion addressed, the buffer store is also arranged to send a signal if the address received from the collector corresponds to that assigned by the distributor 31C for the next signal to be received. When this "caught-up" indication is received by the collector SC it transfers its attention from this last number in that section of the collector store to the next duly assigned number in the second section of the collector store, serving a different group of signalling channels. This continues until all the sections of the collector have provided addresses in the buffer store.

During this cycle of operations a signal may be found in the buffer store. This signal is represented by a binary number which is transferred in parallel form to a signal store in the routing control circuit. This store is of sufficient capacity to take the complete signal and is subdivided so that the different parts of the signal can be handled separately. As an example, the signal may contain a first part representing a signal identity and a second part containing the information of that signal. The contents of the second part of the signal store, i.e., the signal's second part, are passed to logic which decodes the signal. The logic may, for example, cause the signal to be decoded to one of three classifications, i.e., the signalling content represents a selection digit, or it represents a supervisory signal which requires retransmission, or it represents a supervisory signal which requires a special sub-cycle of operations. While the decoding is in progress the contents of the first part of the signal store, giving the signal identity, are transferred in parallel to the call store which also forms part of the route control circuit. The signal identity forms an address to which the circuits giving access to the call store respond. The contents of the call store position so addressed are read out and passed to the control circuit of the call store. The significant portion of the signal and its decoded classification are also passed in parallel form to the call store control circuit.

Each position in the call store contains capacity for a number of digits and for supervisory signals. It also contains a record of the portion of the position addressed in which the next digit should be recorded.

Yet another portion of each store position contains the identity of the the signalling circuit over which the signal should be retransmitted. If this part of the position is occupied the identity will have been read out and should the signal received contain a signal needing retransmission, its identity and the signal are transferred in parallel to the signal sender for action to be described later.

If the signal received concerns a selection digit the control circuit of the call store transfers this digit and any digit previously received and stored and relating to the same call, from the signal store SS to the code translator CT.

The code translator CT forms another part of the route control circuit and comprises a ferrite store in the respective positions of which are stored translations, or instructions, each position corresponding to one of a number of switching centre designations. The basic mode of operation of a ferrite core translator is described in British Patent Specification No. 828,540 (E. P. G. Wright, 197). The digits received by the translator form an address, and this address is used to set the access selector AS to read intelligence from the addressed portion of the translator CT. The information read from the translator may indicate that further selection digits are needed before another signalling circuit can be selected, and if this is the case the information is passed to the control circuit CSC of the call store CS which thereupon records the information read out including the new digit in its correct portion of the store. The translation is re-recorded in the translation store CT. On the other hand, if the signalling content is sufficient to cause the translator to read the switching centre designation, for example, the code for the appropriate signalling circuit is passed to the call store CS, which passes that information and each of the numerical digits of the number via its control circuit CSC to a signal sender (not shown) for retransmission. Again, the translation is re-recorded in the translation store.

It is also necessary that a call identity number should be associated with the signals sent out and this identity number will also be required for signals dealing with the subsequent signals relating to the same call. It is therefore arranged that the control circuit CSC applies for an identity number for the call as soon as the signalling circuit to be used is chosen, and having obtained this number passes it to the signal sender, and at the same time store it in the correct position in the call store position relating to that call.

Each signalling circuit is assigned a group of identity numbers and each of these numbers is recorded as available or previously assigned. An application for an identity number is therefore passed to the identity number generator ING which is another store. The identity number generator ING is arranged to scan its contents to find a free identity number which can be used. The identity number generator for each signalling circuit can take the form of a shift register which is stepped round to find a free number, the value of this number being obtained by a binary counter which counts the steps. The number assigned is transferred to the circuit CSC. When assigning a new number its assignment is duly recorded in the shift register. The identity numbers associated with signalling circuits each have their own position in the call store and subsequently received backward signals will arrive as "incoming signals" which will be directed to the appropriate position in the call store CS. It is therefore an additional function of the control circuit CSC to record the association of the incoming and outgoing identity numbers for signals received in either direction. Hence, besides recording the identity of the outgoing call in the store position allocated to the incoming signal it is also necessary to store the identity of the incoming call in the store position allocated to the outgoing signal. For example, a selection digit received for a signal identified by serial number 7 in signalling circuit 4 may be due to be transmitted with an identification of serial number 5 in a signalling circuit B–C. In the call store position relating to signalling circuit 4, serial 7, the associated identity of signalling circuit 7 serial 7, 5 is recorded. Likewise in the call store portion relating to signalling circuit 7 serial 5 the associated identity of signalling circuit 4 serial 7 is also recorded. Hence any supervisory signal which needs retransmission can be assembled with its proper identification.

Before a message channel has been assigned, any identification number given to a signal is unrelated to any channel for transmitting a message. The numbers provided by the generator ING are only temporary in as much as they are only required until a message channel is assigned, when a new identity number relating to that channel replaces the first identity number. The first identity numbers are then cancelled and become available for subsequent calls.

The receipt of an incoming signal provides the routing control circuit with knowledge of:

(1) The signalling circuit over which the signal is received, (2) The identity number of that signal, and (3) The digits of, for example, the country code, which normally identifies the signalling circuit through which the destination should be reached for the signalling information.

The routing control is arranged to sort this information into signal code format, and writes as many signals as are necessary in the outgoing buffer store.

Once the outgoing signalling circuit to be used for a call has been assigned, its identity is stored in the call store and its presence there is ascertained when subsequent signals arrive. The programme, having determined that the call has been extended to an outgoing signal circuit assembles the new information into a signal for further transmission as required.

It is the function of the message sender to insert signals to be retransmitted in an appropriate position of an outgoing buffer store, so that the signals are retransmitted in the proper order. The buffer serves a number of outgoing signalling circuits which apply periodically to the buffer for more information to transmit. As an example, a signalling circuit may have storage for two signals and when it has transmitted a signal it always makes application to the buffer to provide a new signal to replace the one transmitted. It will be appreciated that the signalling circuit may operate differently, such as taking half a signal at a time. It is arranged that each signalling circuit withdraws its signals from positions in the buffer as required, and that the cyclic order of withdrawal is normally unchanged. The signalling circuits withdraw the signals sufficiently before they need them to cover delays due to several signalling circuits simultaneously applying for signals.

In the case of the collector SC it was necessary to scan each position in each section of the buffer in an invariable sequence. The message sender does not need to insert messages into positions of the outgoing buffer according to an invariable sequence. Its function is to insert them in such a position that they will be transmitted as soon as possible.

The signal sender contains only a single signal store (instead of one store for each signalling circuit served by the buffer). When the signal sender receives a signal requiring retransmission, it responds to an address signal indicating the appropriate signalling circuit, this signal having been provided by the translator CT. The signal is a binary number passed in parallel by means of a wire for each digit and is decoded by the signal sender. The signal sender causes an interrogatory signal to be sent to the distributor controlling the extraction of signals from the buffer over the signalling circuit concerned. The position of this distributor is signalled back to the signal sender to cause a number store in the signal sender to take up the same position. The signal sender then sends to the buffer access equipment the address in its number store, so that the contents in this portion of the buffer can be read out. Thus the signal sender ascertains whether or not this position in the buffer store is already occupied by a preceding signal. If the sender finds that the position concerned is already occupied by a signal, the sender is caused to advance its number store by one unit and the buffer re-records the signal read out. After the signal sender has advanced its store, the interrogation of the buffer is repeated until eventually the signal sender finds a free position and the signal is transferred to the buffer control circuit so that it can be inserted in this free position. It will be noted that any signals so inserted in the buffer will be inserted in positions in advance of those being read by the distributor controlling signal extraction. The signal sender is now available to control the insertion of the next signal for an outgoing buffer.

Certain signals will require precedence over others. For instance, a signal such as the "answer signal" may be given precedence. As already explained, the call store control circuit is provided with the classification of each incoming signal by the decoding logic associated with the collector SC, and this information is passed on to the signal sender at the same time as the identity of the outgoing signalling circuit. In order to give the facility of signal precedence, the buffer for outgoing signals has extra signal positions not normally scanned by the distributor responsible for extracting outgoing signals. The precedence signal sets the number store in the signal sender to the first address reserved for precedence signals. An attempt is made to insert the precedence signals in this special position, or if this position is occupied in succeeding special positions, and the buffer records the fact that there is a precedence signal waiting for a particular signalling circuit. The distributor extracting signals from the buffer is bypassed by the signalling circuit concerned which extracts all waiting precedence signals before returning to the address indicated by the distributor for normal signal extraction.

If it should happen that no free precedence position is available, the signal sender is informed and applies for the next normal position.

Certain signals such as the "clear backward signal" require the re-transmission of two signals. This fact is recognized by the control circuit CSC which passes the two signals to the sender in turn. It should be understood that the CSC has one or several sequence control circuits so that a sequence of operations may be controlled when necessary. The recognition that an incoming signal necessitates two outgoing signals causes the sequence control of CSC to pass through an extra position to control the transmission of the second signal.

Another signal category requiring special action is that for signals asking for the setting up of message connections in preparation for a conversation. The selection of the message connections is controlled by the marker circuit in response to instructions received from the call store control circuit CSC. The construction and operations of such marker circuits are known and are described, for example, in U.S. Patent No. 2,853,556 issued to F. P. Gohorel. The selection of the message connection is controlled by the marker in response to instructions received from the control circuit CSC.

It has already been explained that the call store holds identity numbers applicable to all forward and backward signals and that these identity numbers provide information about the routing requirements of a call. In the simple case a knowledge of the incoming and outgoing signalling circuit indicates that free message circuits in each of two groups of lines need to be interconnected. The marker maintains a record of the free or engaged condition of all incoming and outgoing message circuits and of all the cross-office links. By examining the various possibilities the marker can choose a suitable set of cross-office links to interconnect free incoming and outgoing message circuits.

In other circumstances the signal passed to the marker indicates that the incoming and outgoing message circuits have already been assigned and only the cross-office links need to be selected. The function normally undertaken by markers in cross-bar systems may be required if only the incoming or outgoing circuit has been previously assigned.

If both the incoming and outgoing message circuits had previously been assigned the information does not need to be passed from the marker to the control circuit CSC as the information has already been stored there as a sequence of signals received. Such signals are recognized by their category and replace the identity numbers previously described.

If the marker selects one or both of the message circuits it transfers information concerning their identity so that it may be recorded in the call store and communicated over the appropriate signalling circuits to the other centres concerned. If desirable, the identity of the cross-office links can also be passed to the call store to be recorded.

It will be appreciated that at the end of the communication connection the marker is again connected to the control circuit so that a signal can be sent to the marker to release the speech circuits and cross-office links so that they may become available for further connections.

The marker can control either electro-mechanical or electronic switching equipment. In the latter case the links assigned might be time positions on a highway. The marker examines the different time positions and having made a selection generates a series of pulses to effect the appropriate switching operations throughout the call.

As has been stated above the removal of all signals relating to a call from the message channels has certain advantages. Normally in systems where the signals are carried by the message channels the extension of the message circuits is integral with the extension of the signalling circuits from centre to centre. In the system described above the markers are not instructed to set up message connections until the signalling routes have been completed. This allows several methods of operation in regard to the setting up of the speech circuits.

In the first case the message channe's are connected as a result of delayed switching procedure in the forward direction:

(1) The numerical digits are processed into the Routing Control as previously described.

(2) When the Country Code is complete a translation is obtained indicating the signalling route to the country concerned in this case, say route BE. The Marker is not involved.

(3) The Country Code digits are retransmitted by one or a number of signals over the signalling channel to BE.

(4) The remaining digits are repeated to BE.

(5) As the equipment at E must be able to associate these signals as relating to the same call a serial number is assigned to each call and included in each of these signals.

(6) When a predetermined number of digits have been received in the terminal country a backward "connect" signal is transmitted to the originating tete-de-ligne centre.

(7) This "connect" signal in the originating centre at A—see FIG. 2—is caused to make a connection between the Routing Control circuit and the Marker with instructions to search for a free connection.

(8) If a high-usage circuit from A to C is available the Marker at A makes the connection and indicates the links and outgoing circuit identity to the Routing Control.

(9) The Routing Control initiates a signal to C via B indicating the association between the circuit chosen and the identity number of the connection.

In the second case the message channels are connected as a result of delayed switching procedure in the backward direction:

(1) With a backward connection procedure it is unnecessary to pass back a "connect" signal.

(2) The Routing Control at the incoming tete-de-ligne centre E makes connection with the Marker which is instructed to seek a connection over the high-usage route to A.

(3) The identity of the circiut is passed back over the signalling circuit of the final route to A where the connection is also established.

(4) If no high-usage circuit is available a selection of another circiut must be undertaken and the identity of this circuit indicated.

(5) The Route Control at the transit centre B must then undertake through its Marker or by a signal to the Route Control at some other transit centre the task of finding a further circuit to extend the connection.

(6) This process must be continued until the orginating centre is connected.

In both cases the signalling in carried out by signalling circuits over routes associated with the final message routes. However, as has been previously explained, it is possible to use signalling routes which are not associated with the final message channel routes. In such cases the switching centres not involved in setting up message routes merely handle the signals in their routing control circuits and where necessary send connection signals to those centres which do not form part of the signal routes but which do form parts of the message routes. These latter centres therefore only receive the connection signals which are passed on to their markers.

It has been previously mentioned that the invention is suitable for TASI telephone systems. The TASI system is based on the fact that, during an average telephone call, less than half the call time is spent on actually transmitting speech. The remainder consists of signalling time, pauses between syllables, words, phrases etc. Also a considerable amount of time is wasted between the termination of speech by one person and the commencement of speech by the other person replying. The TASI system utilises the pauses and other "dead" time in a call to make the channel available for any other call that may require to transmit speech during these periods. In practice the number of calls that can make use of a TASI system is approximately double the number of channels. For a system employing, for example, 36 channels, 72 calls can be satisfactorily accommodated. At worst, the amount of lost speech experienced is small enough not to cause significant deterioration in speech quality.

FIG. 6 illustrates in block schematic form a basic TASI system of the type described above, accommodating seventy-two line connections on a system of thirty-six channels (CH 1–36), the channels being (most probably)

carrier channels on a single repeatered coaxial cable. The blocks LTE represent individual line terminating equipments, while the large block "TASI EQUPT" represents all the equipment involved in a TASI conversion. The individual line terminating equipments are associated with signal channel terminating equipments represented by the blocks marked SIG. It will be appreciated that each signal channel may serve more than one of the seventy-two lines.

In a TASI system utilzing the invention the thirty-sixth communication channel is used as a separate signalling channel for the seventy-two lines, which in such a case will share the first thirty-five communica.ion channels on a time assignment basis.

The number of trunks which can be served by a separate signalling channel is a function of the number and duration of signals to be transmitted and the delay liability which can be tolerated. It is unlikely that during the busiest periods the number of signals to be transmitted would exceed the number required for TASI disconnects.

Thus in a TASI system the use of medium-speed data signals in place of voice frequency signals would enable one channel to handle all the signalling requirements for a considerable number of speech channels. The medium-speed data rate is nearly two orders faster than conventional line signals on TASI type systems, and is about an order faster than conventional multifrequency interregister signalling.

Line and inter-register signals need only be sufficiently long to convey the information which they signify. It is unnecessary to extend the signals so that they will override a long delay which may be only infrequently experienced. With regard to inter-register signals there is complete freedom to send digits independently without encountering the likelihood of a long access or hang-over delay.

The number of possible signals using data-type signalling is large in scope and exists for a large variety of different signals for applications where many signals are advantageous.

The difficulties introduced by the use of variable national numbering schemes can be overcome in many circumstances by the use of a Number-Received Signal passed back to the register at the outgoing centre. The receipt of this backward signal can eliminate the need to apply a 4 second time-out additional to the post-dialling delay.

Backward signals can be used to indicate failure to complete the connection. Such signals can be used to apply a suitable tone to notify the caller. In other circumstances the signal may be used to initiate automatically a second attempt to establish the connection. Whether or not backward signals are employed for second attempts there is a definite advantage from the maintenance point of view in informing any of the centres concerned in an attempted connection of the identity of the point beyond which the connection cannot be extended. For a network in which differences in respect of language and procedure have to be taken into account, it is particularly necessary for the report to pass back to the originating country.

The use of a separate channel for line and register signals means that there is no loading on the speech channels during the setting-up of the connections. With appropriate busy signals there is no loading on the speech channels for a call which experiences congestion on the line, or an "engaged" condition of the called party. Frequent attempts to establish a connection by one or a group of subscribers provides no overload to the speech channels.

The separate channel signalling also provides a simple means of transmitting service signals not relating to any particular call.

When a signalling channel is used for several connections and it becomes necessary to supply an identity indication with each signal, a combination of about 12 elements could indicate both the signal and the identity. The duration of such a combination would only be of the order of 10 milliseconds, which would represent a reduction of two orders on line signals and one order on register signals in comparison with the signals used in conventional systems.

It is believed that a new intercontinental signalling system should be suitable for handling switched data traffic which may be expected in many cases to represent quite short messages. The terminal apparatus for data subscribers would always be larger than for a telephone subscriber and usually larger than for a teleprinter subscriber. A separate channel signalling system would enable a data call to be established quickly and the Answer Signal to be returned quickly. As a consequence the holding time of the registers would be small and the intercontinental circuits would be used efficiently in spite of the fact that the message holding time was small.

The use of a separate channel for signalling has the consequence that the associated speech channels suffer no restrictions in respect of the use of the whole bandwidth for the message traffic. With in-band line signalling it is impracticable to employ the same type of signalling as that used for any form of data message.

For satellite and cable circuits not equipped with TASI systems it is also practicable to use separate channel signalling and again the possibility exists of engaging the message circuit only after progress has been made with the establishment of the connection. The use of a separate signalling channel may prove to have wider possibilities on satellite than on cable systems. As an example, with satellite operation it may be specified that facilities should exist to enable a connection to be routed through a particular centre selected from a number of centres any of which can be directly reached over the same channel of a satellite system.

FIG. 7 illustrates a possible satellite system utilizing a communication satellite S in association with ground stations A, B, C, D and E. Stations A, C and E are provided with oneway and bothway message paths to and from the satellite, oneway message paths being shown by broken lines with arrow-heads and bothway message paths by full lines with double arrow-heads. Stations B and D are connected with the satellite by means of bothway speech paths only. Stations A, C, E and D are connected by land line signalling circuits (shown as full lines with no arrow-heads) with station B.

The one-way channels to or from the satellite may be, in effect "halves" of four-wire channels, while bothway channels are "full" four-wire channels. Again, the $A \rightarrow S$ channel is, in effect a multi-terminal one as it gives access from S to C and E. Some complication is introduced into the channels via the satellites due to the need for proper choice of frequencies used, but this is not discussed in detail. For example, station B may be a North American station and stations C and E European stations, with the signal circuits being carried over trans-Atlantic cables. Switching centres F and G are connected by means of ordinary line circuits to stations C and E.

In the case of a call from A to C it is assumed that A has direct high usage circuits to C and multi-termination circuits leading to B and E via the satellite S. The procedure followed in setting up the call would be as follows:

(1) The first and second digits of the number are received and retransmitted from A to B.

(2) The signals for the calls are each associated with a channel number (i.e., a temporary number is attached).

(3) The first and second digits of the number may indicate to the Routing Control at B that the wanted centre is C and the Country Code digits or a terminal signal are passed from B to C.

(4) Further digits are repeated from A to C via B.

(5) At some predetermined time a "connect" signal is returned from C to B to enable B to complete the connection.

(6) The Routing Control at B consults the channel engagement conditions and selects, if free, an independent link from A–C.

(7) The Routing Control transmits signals to A and C indicating the selection to be made at each terminal.

(8) The identity number for further signals is also changed as a consequence of the choice of channel.

(9) If there is no independent channel free from A to C but there is a multi-termination channel from A giving access to C in addition to other centres it is selected.

(10) Signals are sent to A and C as in (7) and (8) above.

Signals may also be sent to other terminations of the channel to advise them that the channel is in use. If no channel of either kind is available it is necessary for an attempt to be made by using a transit connection through B, D or E. Assuming message traffic conditions do not exclude any of these routes, the Routing Control at B will undertake a search of a pair of circuits capable of connecting A to C via one of these other centres. If it is decided to make the connection from A to C via E, a signal is sent to A and to C indicating the channel to be used. In addition signals are sent to E to cause the necessary connection to be made at E.

For a connection between A and G in the condition that G is obtainable through either C or E, the connect signal from G will select a channel in the preferred group, say, G to C after which the procedure will be as described above.

If the initial transmission of digits has taken place from A to B and from B to C and from C to G but it is necessary to select a free speech circuit between G and E, the procedure is substantially the same but the message from C to B needs to indicate that the connection is required between E and A rather than between C and A.

It is also possible for one of the ground stations such as station B to have storage facilities in the routing control sufficient to hold information regarding all the satellite circuits whether or not they are associated with station B so that in case of congestion station B can advise other stations of alternative routing facilities.

Another point to be noted is that by sending signals over cable, their propagation times are reduced compared with the times which would apply when sent by radio.

We claim:

1. A telecommunication system including a number of message channels linking at least two switching centres by different routes, separate independent signalling circuits linking said centres, each centre including signal processing and route control equipment to receive signals relating to the establishment and supervision of a message connection and to process the signals in accordance with the significance of the signals and to retransmit the signals according to said significance over appropriate signalling circuits, the signal processing and route control equipment in the switching centres including means to select and complete a signal circuit route between said centres prior to the seizure and occupation of a message channel route.

2. A telecommunication system according to claim 1 wherein each switching centre is provided with incoming and outgoing message channels and switching means therefor and separate independent incoming and outgoing signalling circuits, each centre being provided with common signal processing and route control equipment arranged to receive over incoming signal circuits, at random intervals, signals relating to the establishment and supervision of a message connection, said equipment including call storage means for storing information derived from the received signals, translation means for translating information derived from the signals in terms of instructions relating to the processing of the signals, sending means for retransmitting over outgoing signalling circuits signals relating to the extension of the signalling circuit routes, and message channel selection means arranged to control the switching of incoming and outgoing message channels after the completion of the signalling concerned with the establishment of the call.

3. A telecommunication system according to claim 2 in which all signals relating to the same message connection are assigned an identity number for the purpose of that message connection only, so that signals relating to the routing of the same message may be associated together, and in which the signals relating to the supervision of the message connection are subsequently assigned a different identity number when the message circuits are switched.

4. A telecommunication system according to claim 2 including means for supplying the translator with both the identity of the source and the destination of a call whereby the translator is enabled to extend the signalling circuit over the route most appropriate to the call.

5. A switching centre for a telecommunication system including a plurality of incoming and outgoing message channels and switching means therefor, and separate independent and outgoing signalling circuits providing a means of exchanging signals relating to the establishment and supervision of message connections over the message channels, the centre including incoming and outgoing signal buffers, means for scanning the incoming buffers to ascertain the presence therein of incoming signals, means for transferring said signals to a signal store, means for transferring an address portion of the signal to a call store whereby the transferred signals provide an address of a position in said store, means for decoding the remainder of the signal according to a predetermined classification, means for transferring said decoded signal together with intelligence previously stored in that position of the call store addressed by the address portion of the signal, to a translator, the signals so transferred providing an address to a position in the translator, containing instructions relating to the processing of the signals received by the centre, means for initiating new signals in the call store according to an instruction received from the translator, and means for transferring said signal message to an outgoing signal buffer for transmission over an outgoing signalling circuit.

6. A switching centre according to claim 5 including means for storing instructions relating to the switching of a message channel until the completion of the signalling route.

7. A switching centre according to claim 6 including means for generating an identity number for each signal originating at the centre prior to the switching of the message channel, and means for changing said identity number when said message channel is switched.

8. A switching centre according to claim 7 including means for storing information relating to the establishment and supervision of calls routed through other switching centres.

References Cited

UNITED STATES PATENTS

| | | | |
|---|---|---|---|
| 1,688,455 | 10/1928 | Demarest et al. | 179—27 |
| 1,862,587 | 6/1932 | Almquist | 179—43 |
| 3,111,559 | 11/1963 | Jacobaeus et al. | 179—18 |

WILLIAM C. COOPER, *Primary Examiner.*